(12) United States Patent  
Kim

(10) Patent No.: US 9,317,909 B2  
(45) Date of Patent: Apr. 19, 2016

(54) IMAGE SUBSYSTEM INCLUDING IMAGE FEATURE DETECTION HARDWARE COMPONENT AND IMAGE PROCESSING SYSTEM INCLUDING THE SAME

(71) Applicant: SAMSUNG ELECTRONICS CO., LTD., Suwon-Si, Gyeonggi-Do (KR)

(72) Inventor: Dong Hoon Kim, Gyeonggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 14 days.

(21) Appl. No.: 14/174,328

(22) Filed: Feb. 6, 2014

(65) Prior Publication Data

US 2014/0240541 A1    Aug. 28, 2014

(30) Foreign Application Priority Data

Feb. 27, 2013  (KR) .................. 10-2013-0021553

(51) Int. Cl.
G06T 5/50    (2006.01)
G06T 5/00    (2006.01)
G06T 1/20    (2006.01)

(52) U.S. Cl.
CPC . *G06T 5/009* (2013.01); *G06T 1/20* (2013.01); *G06T 2207/10016* (2013.01); *G06T 2207/20208* (2013.01); *G06T 2207/20221* (2013.01)

(58) Field of Classification Search
CPC .............................................. G06T 2207/20221
USPC .......................... 348/231.99, 222.1; 382/103
See application file for complete search history.

(56) References Cited

U.S. PATENT DOCUMENTS

| | | | |
|---|---|---|---|
| 8,786,716 B2* | 7/2014 | Zhou | 348/208.4 |
| 2004/0013314 A1* | 1/2004 | Peli | 382/254 |
| 2005/0201595 A1* | 9/2005 | Kamei | 382/118 |
| 2006/0269136 A1* | 11/2006 | Squires et al. | 382/181 |
| 2012/0163728 A1* | 6/2012 | Sun et al. | 382/260 |

* cited by examiner

*Primary Examiner* — Joel Fosselman  
(74) *Attorney, Agent, or Firm* — F. Chau & Associates, LLC

(57) ABSTRACT

An image processing system includes a hardware block and a central processing unit (CPU). The hardware block receives a first image and generates a first feature value and a first segmented image from the first image. The CPU generates a first transformation matrix based on the first segmented image and the first feature value. The hardware block also generates a first transformed image by applying the first transformation matrix to the first image.

17 Claims, 22 Drawing Sheets

<Original Image>      <Segmented Image>

FIG. 9

$$\text{TRMATRIX1 }(dx,dy,dz) = \begin{Bmatrix} 1 & 0 & 0 & dx \\ 0 & 1 & 0 & dy \\ 0 & 0 & 1 & dz \\ 0 & 0 & 0 & 1 \end{Bmatrix}$$

FIG. 10

$$\text{TRMATRIX2 }(sx, sy, sz) = \begin{pmatrix} sx & 0 & 0 & 0 \\ 0 & sy & 0 & 0 \\ 0 & 0 & sz & 0 \\ 0 & 0 & 0 & 1 \end{pmatrix}$$

FIG. 11

$$\text{TRMATRIX3}(\theta) = \begin{pmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{pmatrix}$$

$$\text{TRMATRIX4}(\theta) = \begin{pmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{pmatrix}$$

$$\text{TRMATRIX5}(\theta) = \begin{pmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{pmatrix}$$

FIG. 12

$$TRMATRIX6 = \begin{pmatrix} 1 & d & g & 0 \\ b & 1 & i & 0 \\ c & f & 1 & 0 \\ 0 & 0 & 0 & 1 \end{pmatrix}$$

IMAGE SUBSYSTEM INCLUDING IMAGE FEATURE DETECTION HARDWARE COMPONENT AND IMAGE PROCESSING SYSTEM INCLUDING THE SAME

CROSS-REFERENCE TO RELATED APPLICATION

This application claims priority under 35 U.S.C. §119 from Korean Patent Application No. 10-2013-0021553, filed on Feb. 27, 2013 in the Korean Intellectual Property Office, the disclosure of which is incorporated by reference herein in its entirety.

TECHNICAL FILED

The present inventive concept relates to an image subsystem and an image processing system including the image subsystem.

DISCUSSION OF RELATED ARTS

Image processing processors are used in digital cameras, mobile phones or other electronic devices having a camera and/or video function. The image processing processor may perform various functions to enhance the quality of images by correcting the luminance, brightness and chroma of images. The image processing processors may perform functions such as noise reduction process, white balancing, color filter array (CFA) interpolation, color correction, gamma correction, and/or color contrast enhancement.

SUMMARY

According to an exemplary embodiment of the inventive concept, an image processing system includes a hardware block and a central processing unit (CPU). The hardware block receives a first image and generates a first feature value and a first segmented image from the first image. The CPU generates a first transformation matrix based on the first segmented image and the first feature value. The hardware block also generates a first transformed image by applying the first transformation matrix to the first image.

According to an exemplary embodiment of the inventive concept, an image processing system for performing a plurality of image processing operations includes a bus, a hardware block and a CPU. The hardware block, coupled to the bus, receives a first image and generates a first feature value and a first segmented image from the image for each image processing operation. The CPU, coupled to the bus, generates a first transformation matrix based on the first segmented image and the first feature value for the each image processing operation. The hardware block further generates a first transformed image by applying the first transformation matrix to the first image.

BRIEF DESCRIPTION OF THE DRAWINGS

These and other features of the inventive concept will become more apparent by describing in detail exemplary embodiments thereof with reference to the accompanying drawings of which:

FIGS. 9 through 12 are exemplary transformation matrices illustrated in FIG. 8;

DETAILED DESCRIPTION OF THE EMBODIMENTS

Figure 1:
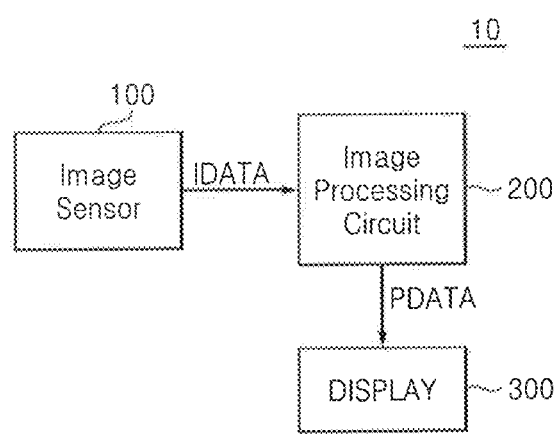
FIG. 1 is a block diagram of an image processing system according to an exemplary embodiment of the inventive concept.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when an element is referred to as being "connected" or "coupled" to another element, it may be directly connected or coupled to the other element, or intervening elements may also be present. Like reference numerals may refer to the like elements throughout the specification and drawings.

FIG. 1 is a block diagram of an image processing system 10 according to an exemplary embodiment of the inventive concept. The image processing system 10 may be implemented as a portable electronic device such as a mobile telephone, a smart phone, a tablet personal computer (PC), a personal digital assistant (PDA), an enterprise digital assistant (EDA), a portable multimedia player (PMP), an e-book, a mobile internet device (MID), or a digital camera.

The image processing system 10 includes an image sensor 100, an image processing circuit 200, and a display 300. The image sensor 100 receives light reflected from an object and outputs image data IDATA corresponding to the object.

The image processing circuit 200 processes the image data IDATA output from the image sensor 100 and outputs processed image data PDATA. The image processing circuit 200 may be implemented as a system on chip (SoC) or a system in package (SIP). In an exemplary embodiment, the image processing circuit 200 may be integrated as an application processor (AP).

The display 300 displays the processed image data PDATA. The display 300 may be implemented by a liquid crystal display (LCD), a light emitting diode (LED) display, an organic LED (OLED) display, an active matrix OLED (AMOLED) display, or a flexible display.

Figure 2:
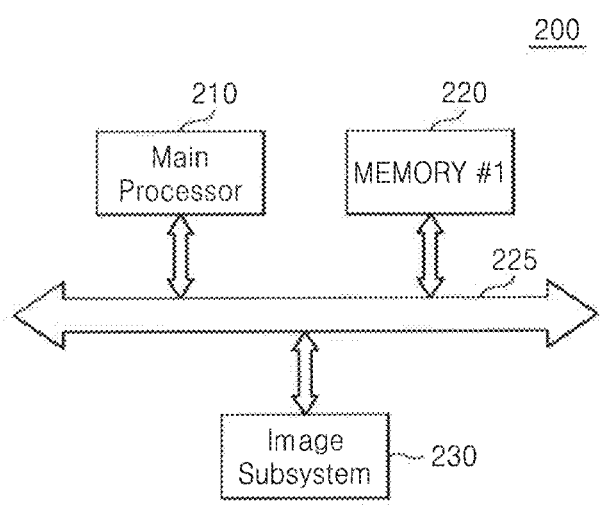
FIG. 2 is a block diagram of an image processing circuit illustrated in FIG. 1 according to an exemplary embodiment of the inventive concept.

FIG. 2 is a block diagram of the image processing circuit 200 illustrated in FIG. 1. Referring to FIGS. 1 and 2, the image processing circuit 200 includes a main processor 210, a memory 220, and an image subsystem 230, which are connected to one another through a bus 225.

The main processor 210 controls the overall operation of the image processing circuit 200 or processes data output from the image subsystem 230. The memory 220 stores data and/or programs necessary for the operation of the image processing circuit 200 or the operation of the main processor 210. The image subsystem 230 processes the image data IDATA output from the image sensor 100. The image subsystem 230 will be described in detail with reference to FIG. 3.

Figure 3:
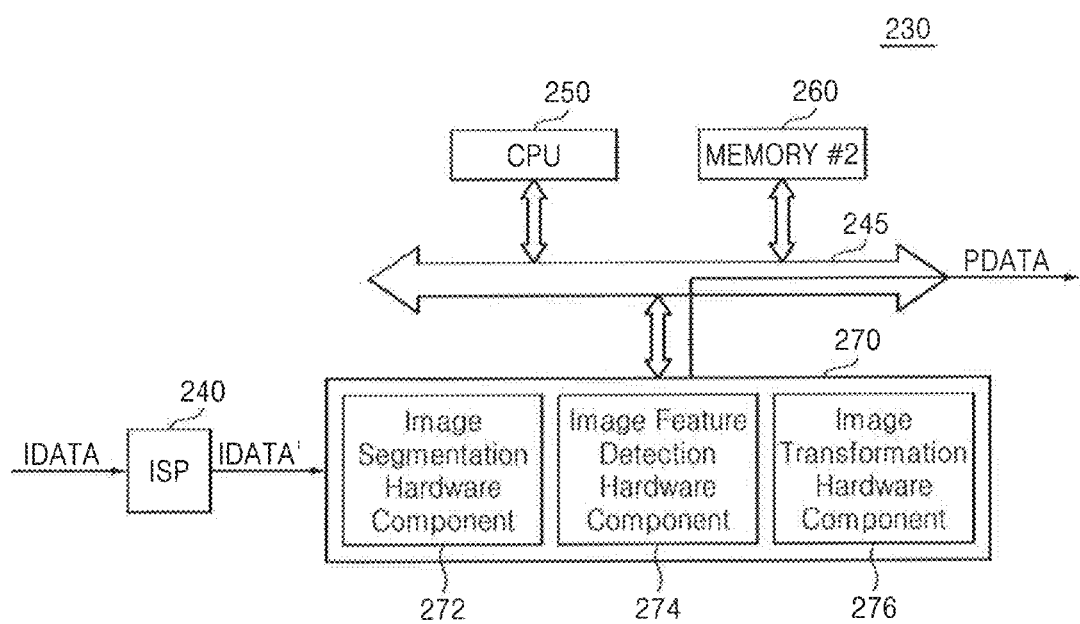
FIG. 3 is a block diagram of an image subsystem illustrated in FIG. 2 according to an exemplary embodiment of the inventive concept.

FIG. 3 is a block diagram of the image subsystem 230 illustrated in FIG. 2 according to an exemplary embodiment of the inventive concept. Referring to FIGS. 1 through 3, the image subsystem 230 includes an image signal processor (ISP) 240, a central processing unit (CPU) 250, a memory 260, and a hardware component block 270.

The ISP 240 processes the image data IDATA output from the image sensor 100 and outputs processed image data IDATA'. For instance, the ISP 240 processes the image data IDATA having a data format corresponding to a Bayer pattern and output the processed image data IDATA' having a format corresponding to RGB color.

The CPU 250 communicates data with the memory 260 and the hardware component block 270 using a bus 245. The image subsystem 230 also includes a separate operation memory (not shown) storing data necessary for the operation of the CPU 250.

The memory 260 stores data processed by the CPU 250 and the hardware component block 270. The memory 260 includes a dynamic random access memory (DRAM) but is not limited thereto.

The hardware component block 270 includes an image segmentation hardware component 272, an image feature detection hardware component 274, and an image transformation hardware component 276. The term "hardware component" refers to a circuit configured to commonly perform a specific algorithm for a plurality of image processing operations. For example, the plurality of the image processing operations includes, but is not limited to, a digital image stabilization operation, a dynamic range improvement operation, or a panorama image generating operation. The segmentation hardware component 272, the image feature detection hardware component 274, and the image transformation hardware component 276 will be described in detail with reference to FIGS. 4 through 12.

Figure 4:
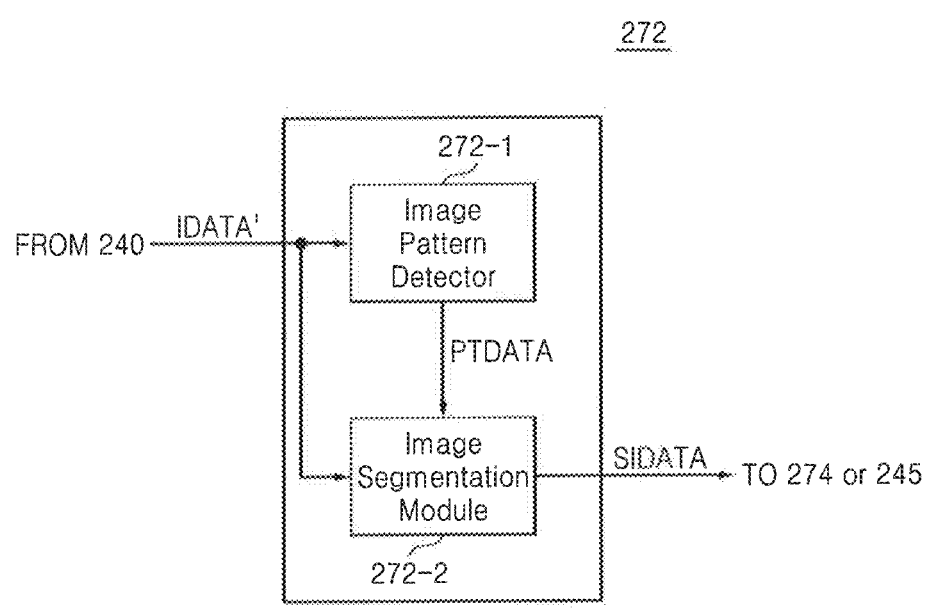
FIG. 4 is a block diagram of an image segmentation hardware component illustrated in FIG. 3 according to an exemplary embodiment of the inventive concept.

FIG. 4 is a block diagram of the image segmentation hardware component 272 illustrated in FIG. 3. Referring to FIGS. 3 and 4, the segmentation hardware component 272 includes an image pattern detector 272-1 and an image segmentation module 272-2.

The image pattern detector 272-1 receives the image data IDATA' from the ISP 240. Alternatively, the image pattern detector 272-1 may receive image data IDATA' scaled by the image transformation hardware component 276.

The image pattern detector 272-1 detects a pattern of the image data IDATA'. For instance, when adjacent pixels included in the image data IDATA' have similar color, the image pattern detector 272-1 groups the pixels into a single group. In other words, the image pattern detector 272-1 detects a color pattern of the image data IDATA'.

Alternatively, the pattern may include a texture pattern. When adjacent pixels included in the image data IDATA' have similar texture, the image pattern detector 272-1 groups the pixels into a single group. The image pattern detector 272-1 detects a texture pattern of the image data IDATA'. The image pattern detector 272-1 outputs pattern data PTDATA according to the detected pattern.

The image segmentation module 272-2 segments the image data IDATA' based on the pattern data PTDATA and outputs segmented image data SIDATA. The expression "to segment image data" may signify to divide an image corresponding to image data into a plurality of regions or elements. For example, the image segmentation module 272-2 divides the image data IDATA' based on the groups defined by the image pattern detector 272-1 and generates the segmented image data SIDATA. The image segmentation module 272-2 outputs the segmented image data SIDATA to the image feature detection hardware component 274 or the bus 245.

Figure 5:
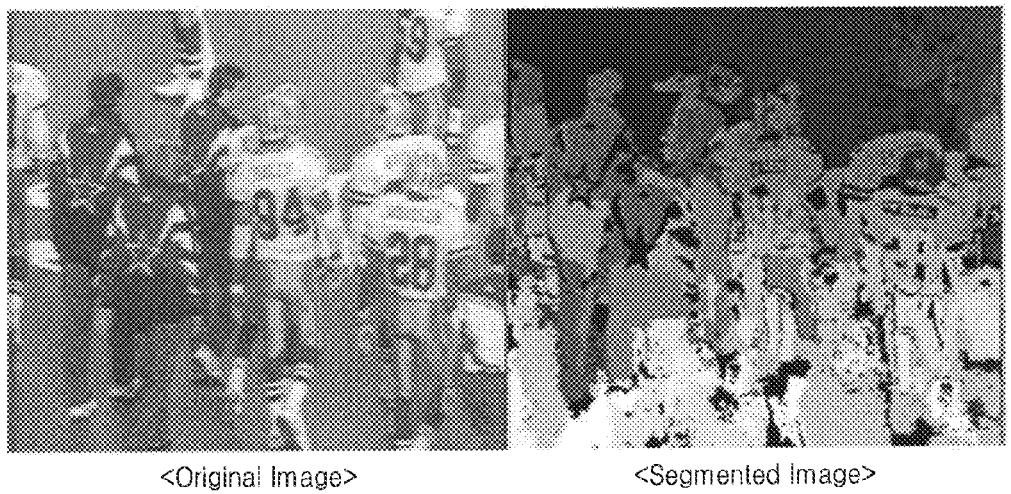
FIG. 5 is a diagram of an exemplary segmented image generated by the image segmentation hardware component illustrated in FIG. 4.

FIG. 5 is a diagram of an exemplary segmented image generated by the image segmentation hardware component 272 illustrated in FIG. 4. Referring to FIGS. 4 and 5, an original image on the left side corresponds to the image data IDATA' and a segmented image on the left side corresponds to the segmented image data SIDATA. The original image may be segmented as in the segmented image according to a color pattern or a texture pattern.

Figure 6:
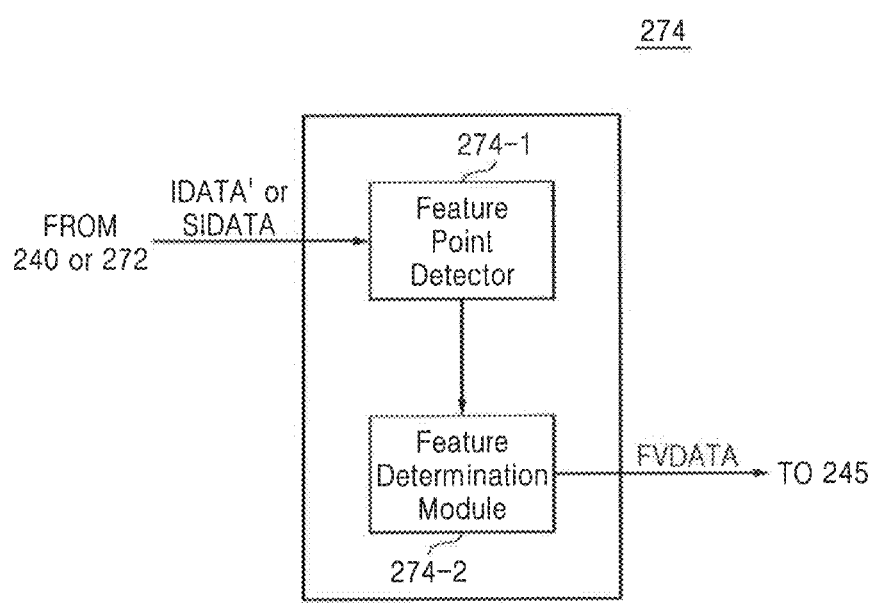
FIG. 6 is a block diagram of an image feature detection hardware component illustrated in FIG. 3 according to an exemplary embodiment of the inventive concept.
Figure 7:
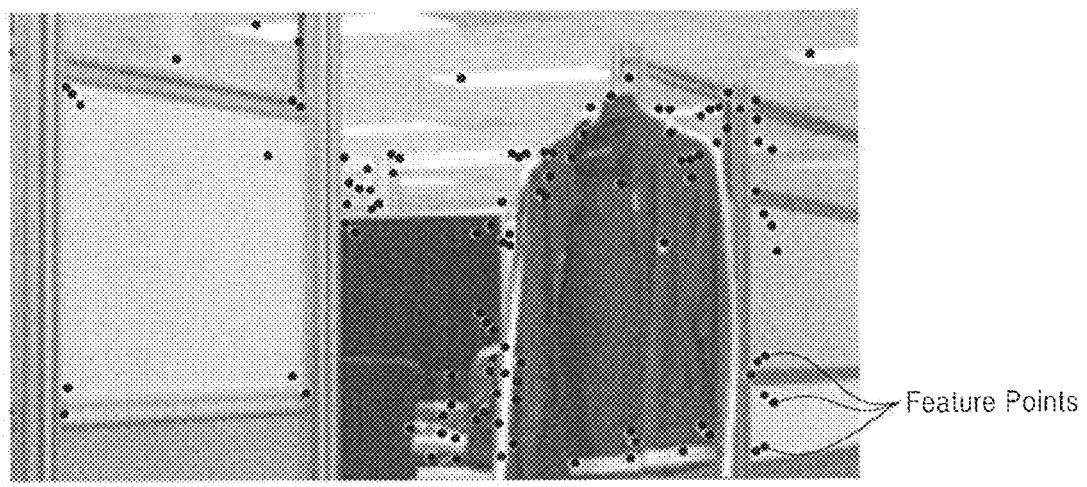
FIG. 7 is a diagram of exemplary feature points detected by a feature point detector illustrated in FIG. 6.

FIG. 6 is a block diagram of the image feature detection hardware component 274 illustrated in FIG. 3. FIG. 7 is a diagram of exemplary feature points detected by a feature point detector 274-1 illustrated in FIG. 6. Referring to FIGS. 3, 6, and 7, the image feature detection hardware component 274 includes the feature point detector 274-1 and a feature determination module 274-2.

The feature point detector 274-1 receives the image data IDATA' from the ISP 240 or the segmented image data SIDATA from the image segmentation hardware component 272. When receiving the processed image data IDATA' from the ISP 240, the feature point detector 274-1 may receive the processed image data IDATA' that is scaled by the image transformation hardware component 276.

The feature point detector 274-1 detects feature points in the image data IDATA' or the segmented image data SIDATA and transmits them to the feature determination module 274-2. The feature points represent the features of the image data IDATA' or the segmented image data SIDATA. The feature point detector 274-1 may include a Harris-Laplace detector or a Hessian-Laplace detector but is not limited thereto. For example, the feature point detector 274-1 may detect feature points using an algorithm such as scale invariant feature transform (SIFT) or speeded up robust feature (SURF).

FIG. 7 shows exemplary feature points detected in the image data IDATA' or the segmented image data SIDATA using the feature point detector 274-1. The feature point detector 274-1 transmits data including information about the feature points to the feature determination module 274-2. Alternatively, the feature point detector 274-1 detects a feature region instead of a feature point. For instance, the feature region may be identified by an edge or a boundary.

The feature determination module 274-2 generates feature value data FVDATA from the feature points based on the data received from the feature point detector 274-1. The feature determination module 274-2 determines significant feature points among the feature points.

For instance, the significant feature points may include adjacent pixels that are brighter than neighboring pixels or pixels whose brightness is greatly different from that of neighboring pixels. The feature determination module 274-2 generates the feature value data FVDATA based on the significant feature points.

Figure 8:
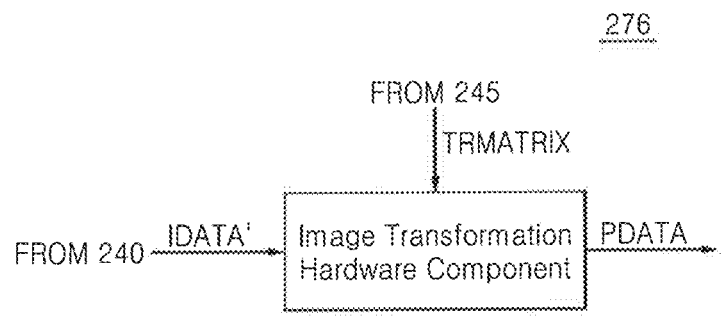
FIG. 8 is a block diagram of an image transformation hardware component illustrated in FIG. 3 according to an exemplary embodiment of the inventive concept.

FIG. 8 is a block diagram of the image transformation hardware component 276 illustrated in FIG. 3. Referring to FIGS. 3 and 8, the image transformation hardware component 276 receives the image data IDATA' from the ISP 240. The image transformation hardware component 276 also receives transformation matrix TRMATRIX, which is generated from the CPU 250 and transmitted through the bus 245.

The image transformation hardware component 276 transforms the processed image data IDATA' using the transformation matrix TRMATRIX and output the image data PDATA resulting from the transformation. The expression "to transform image data" may mean to transform an image corresponding to the image data. The transformation may include rotation, scaling, translation, shearing, or a combination thereof.

The transformation matrix TRMATRIX will be described in detail with reference to FIGS. 9 through 12. FIGS. 9 through 12 are diagrams of examples of the transformation matrix TRMATRIX illustrated in FIG. 8.

Referring to FIG. 9, a transformation matrix TRMATRIX1 is a matrix for translating an image. Referring to FIG. 10, a transformation matrix TRMATRIX2 is a matrix for scaling an image.

Referring to FIG. 11, transformation matrices TRMATRIX3 through TRMATRIX5 are matrices for rotating an image.

Referring to FIG. 12, a transformation matrix TRMATRIX6 is a matrix for performing shear-transformation on an image. According to the transformation matrix TRMATRIX6, the x-coordinate of a pixel located at a position (x, y, z) is transformed into x+(d)*y+(g)*z; the y-coordinate of the pixel is transformed into (b)*x+y+(i)*z; and the z-coordinate of the pixel is transformed into (c)*x+(f)*y+z.

Referring to FIGS. 8 through 12, the transformation matrix TRMATRIX illustrated in FIG. 8 is one of the transformation matrices TRMATRIX1 through TRMATRIX6 or a combination thereof but is not limited thereto.

Figure 13:
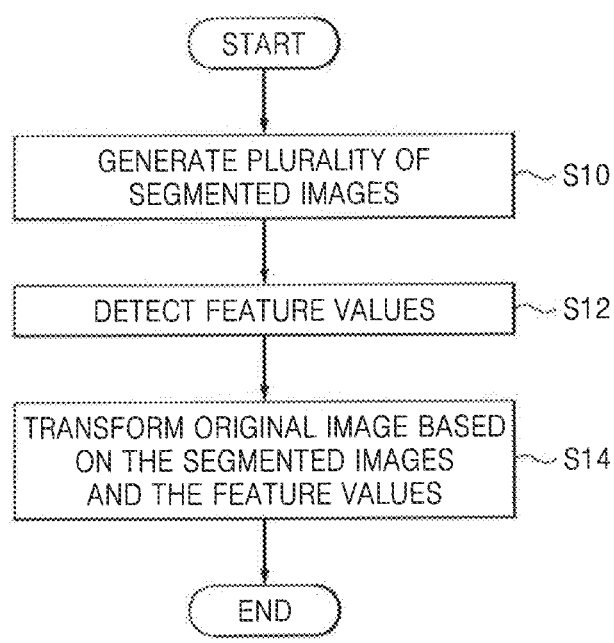
FIG. 13 is a flowchart of a method of operating an image processing system according to an exemplary embodiment of the inventive concept.

FIG. 13 is a flowchart of a method of operating an image processing system according to an exemplary embodiment of the inventive concept. Referring to FIGS. 3, 4, 6, 8, and 13, the image segmentation hardware component 272 segments the image data IDATA' corresponding to each of a plurality of original images and generates the segmented image data SIDATA corresponding to each of a plurality of segmented images in operation S10. Each original image may correspond to a frame.

The image feature detection hardware component 274 detects feature values from the image data IDATA' corresponding to each original image or the segmented image data SIDATA corresponding to each segmented image and outputs the feature value data FVDATA corresponding to the feature values in operation S12.

The CPU 250 generates the transformation matrix TRMATRIX based on the segmented image data SIDATA and the feature value data FVDATA. The image transformation hardware component 276 transforms the image data IDATA' into the transformed image data PDATA using the transformation matrix TRMATRIX and outputs the transformed image data PDATA. For example, the image transformation hardware component 276 transforms the image data IDATA' corresponding to the original image based on the segmented image data SIDATA and the feature value data FVDATA in operation S14.

Figure 14:
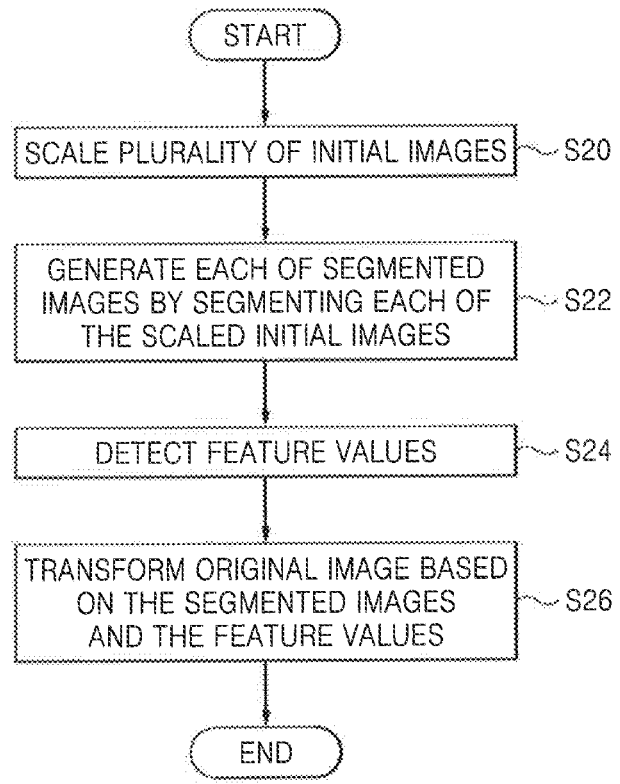
FIG. 14 is a flowchart of a method of operating an image processing system according to an exemplary embodiment of the inventive concept.

FIG. 14 is a flowchart of a method of operating an image processing system according to an exemplary embodiment of the inventive concept. Referring to FIGS. 3, 4, 6, 8, 13, and 14, the image transformation hardware component 276 scales the image data IDATA' received from the ISP 240 using the transformation matrix TRMATRIX generated by the CPU 250 in operation S20.

At this time, initial data (i.e., the image data IDATA' that has been transmitted from the ISP 240 to the image transformation hardware component 276) is scaled by the image transformation hardware component 276 and then transmitted to the image segmentation hardware component 272 and the image feature detection hardware component 274.

The image segmentation hardware component 272 segments the scaled image data received from the image transformation hardware component 276, generating the segmented image data SIDATA in operation S22. The image feature detection hardware component 274 generates the feature value data FVDATA from the scaled image data received from the image transformation hardware component 276 in operation S24. Operation S26 is substantially the same as operation S14 illustrated in FIG. 13.

Figure 15:
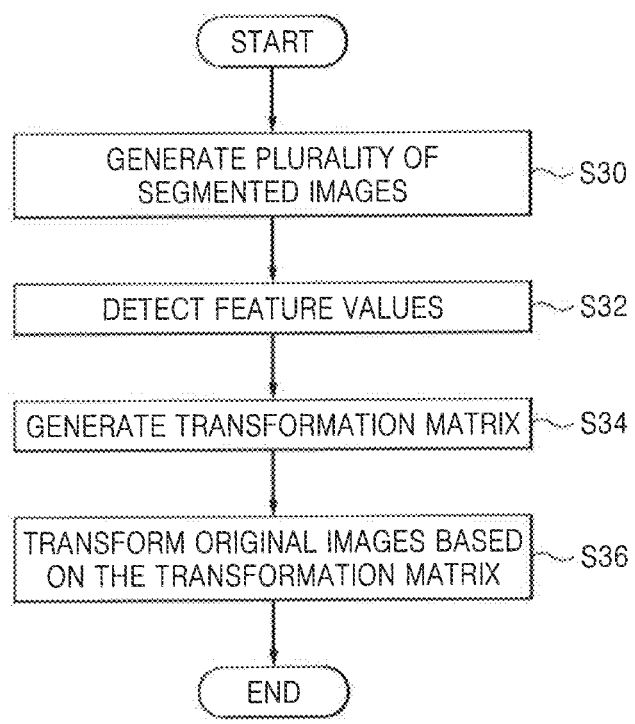
FIG. 15 is a flowchart of a method of operating an image processing system according to an exemplary embodiment of the inventive concept.

FIG. 15 is a flowchart of a method of operating an image processing system according to an exemplary embodiment of the inventive concept. Referring to FIGS. 3, 4, 6, 8, 13, and 15, operations S30 and S32 are substantially the same as operations S10 and S12 illustrated in FIG. 13.

The CPU 250 generates the transformation matrix TRMATRIX based on the segmented image data SIDATA and the feature value data FVDATA in operation S34. The image transformation hardware component 276 transforms the image data IDATA' using the transformation matrix TRMATRIX and outputs the transformed image data PDATA in operation S36.

The CPU 250 determines a local motion vector representing the change or motion in each of objects included in a segmented image corresponding to the segmented image data SIDATA based on the segmented image data SIDATA and the feature value data FVDATA. The local motion vector will be described in detail with reference to FIG. 19 later. The CPU 250 generates the transformation matrix TRMATRIX based on the local motion vector. For example, the CPU 250 may generate one of the transformation matrices TRMATRIX as described in FIGS. 9 to 12.

The CPU 250 generates the transformation matrix TRMATRIX for offsetting the local motion vector. In this case, the image transformation hardware component 276 performs digital image stabilization (DIS) by transforming the image data IDATA' into the transformed image data PDATA using the transformation matrix TRMATRIX.

Alternatively, the CPU 250 generates the transformation matrix TRMATRIX by applying a low weight to an object having a large change and a high weight to an object having a small change according to the local motion vector. In this case, the image transformation hardware component 276 performs three-dimensional noise reduction (3DNR) by transforming the image data IDATA' into the transformed image data PDATA using the transformation matrix TRMATRIX.

The image data IDATA' which is a target of transformation may be about an image corresponding to a current frame. In other words, the image subsystem 230 may perform DIS or 3DNR on the image corresponding to the current frame in real time using the image corresponding to the current frame and images corresponding to previous frames included in a predetermined period. The image subsystem 230 may perform other functions (e.g., optical distortion compensation (ODC)) of the ISP 240 besides DIS and 3DNR.

Figure 16:
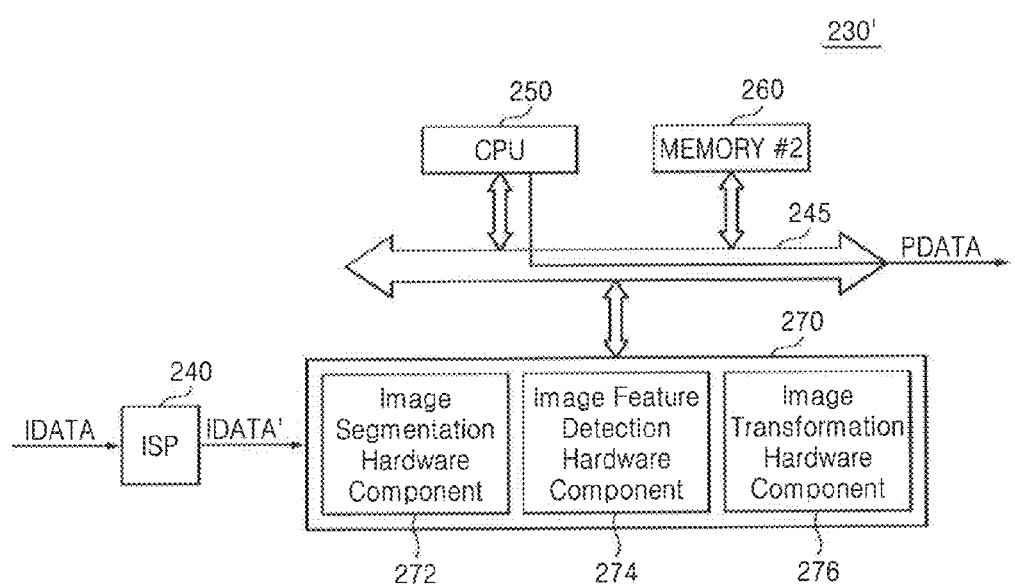
FIG. 16 is a block diagram of an image subsystem illustrated in FIG. 2 according to an exemplary embodiment of the inventive concept.

FIG. 16 is a block diagram of an image subsystem 230' illustrated in FIG. 2 according to an exemplary embodiment of the inventive concept. Referring to FIGS. 2, 3, and 16, the CPU 250 of the image subsystem 230' corresponding to the image subsystem 230 of FIG. 2 performs post-processing operation including, but is not limited to, image merging, on images processed by the hardware component block 270. The image data PDATA resulting from the post-processing operation is output through the bus 245.

Figure 17:
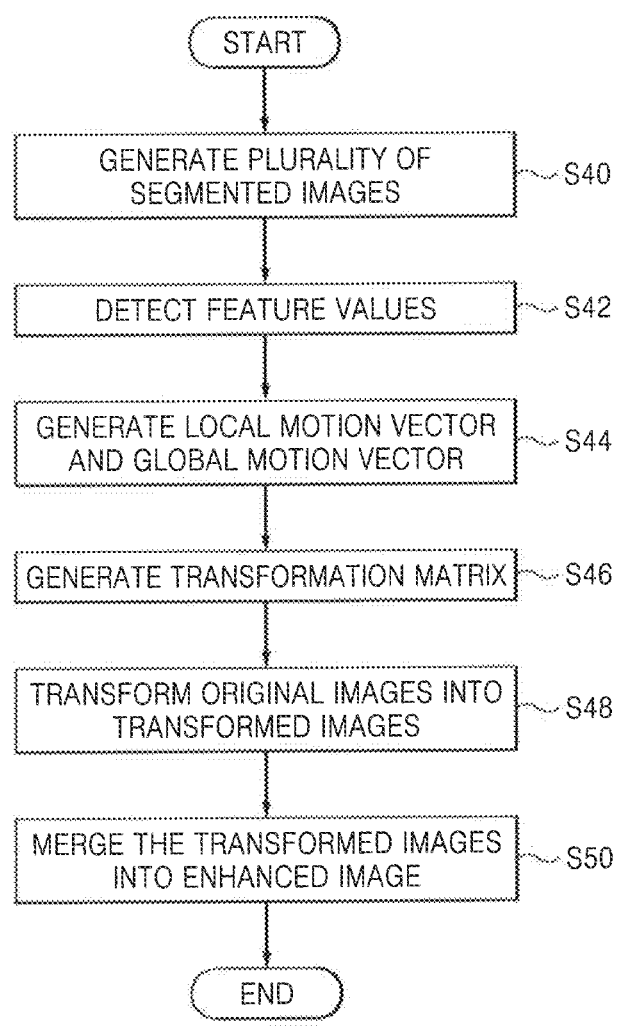
FIG. 17 is a flowchart of a method of operating an image processing system according to an exemplary embodiment of the inventive concept.

FIG. 17 is a flowchart of a method of operating an image processing system according to an exemplary embodiment of the inventive concept. Referring to FIGS. 4, 6, 8, and 15 through 17, operations S40 and S42 are substantially the same as operations S30 and S32 illustrated in FIG. 15.

The CPU 250 calculates a local motion vector representing the change or motion of each of objects included in the segmented image data SIDATA in operation S44. The CPU 250 also calculates a global motion vector representing the change or motion in a view point of the segmented image based on the segmented image data SIDATA and the feature value data FVDATA in operation S44. In calculating the local and the global motion vector, a frame may be selected as a reference frame. The local motion vector and the global motion vector will be described in detail with reference to FIGS. 19 and 20 later.

The CPU 250 generates the transformation matrix TRMATRIX based on the local motion vector and the global motion vector in operation S46. The transformation matrix TRMATRIX includes a homography matrix.

The CPU 250 also generates data necessary to merge a plurality of frames based on the local motion vector and the global motion vector. At this time, the CPU 250 applies a low weight to a frame having a large change in an object and a high weight to a frame having a small change in an object based on the local motion vector when merging the frames. Alternatively, the CPU 250 generates the transformation matrix TRMATRIX for synchronizing view points of the images based on the global motion vector.

The image transformation hardware component 276 transforms the image data IDATA' corresponding to each of a plurality of original images into the image data PDATA corresponding to each of a plurality of transformed images using the transformation matrix TRMATRIX and transmits the image data PDATA to the CPU 250 through the bus 245 in operation S48. Each original image may correspond to a frame.

The CPU 250 merges the transformed images into a single final image in operation S50. The final image has a higher dynamic range as compared to the original images. The CPU 250 outputs the image data PDATA corresponding to the final image through the bus 245.

Figure 18:
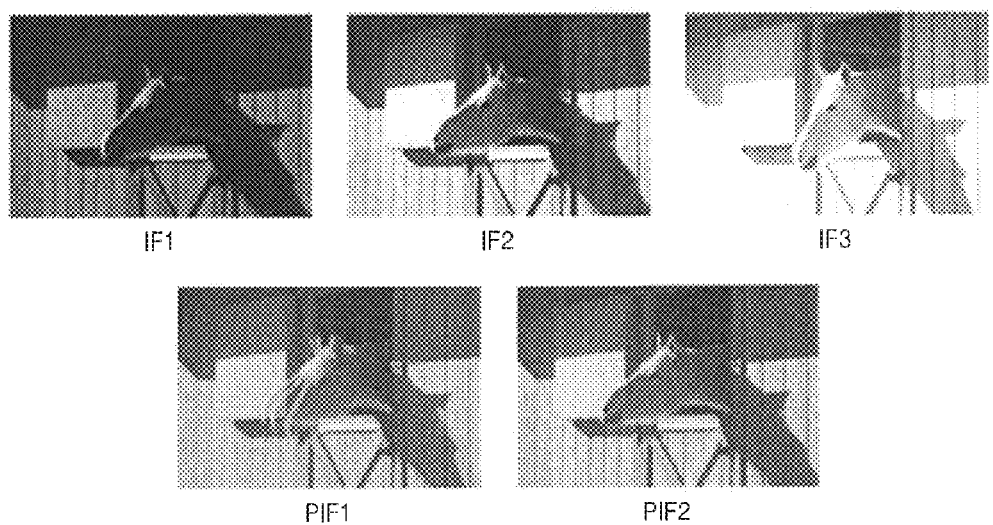
FIG. 18 is a diagram of an example of images with an increased dynamic range according to the method illustrated in FIG. 17.

FIG. 18 shows an exemplary image having an increased dynamic range according to the method illustrated in FIG. 17. Referring to FIGS. 17 and 18, a plurality of frames IF1 to IF3 is generated using different exposure levels. Each frame is processed using the method illustrated in FIG. 17 except for a reference frame. A final image PIF2 with an increased dynamic range is generated by merging the processed frames and a reference frame. In this case, when the local motion vector is not used, afterimage noise may appear as shown in a final image PIF1 in the lower left side.

Figure 19:
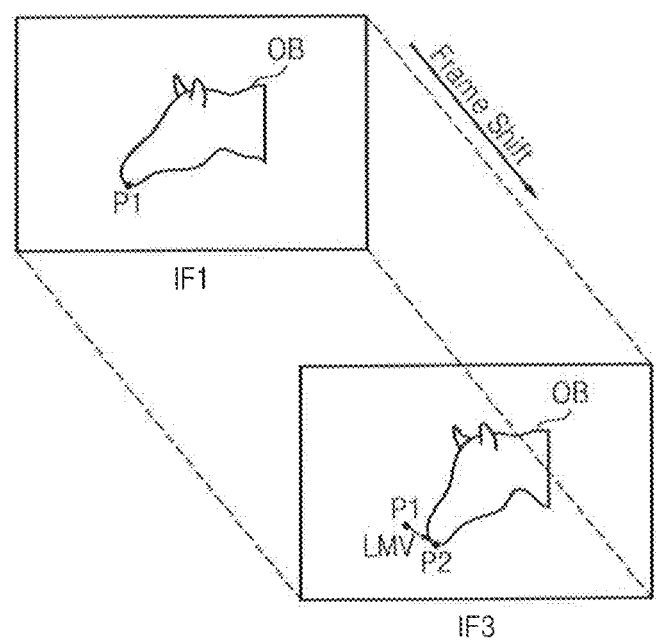
FIG. 19 is a diagram of a local motion vector generated in the course of performing the method illustrated in FIG. 17.

FIG. 19 is a diagram of a local motion vector LMV generated in the course of performing the method illustrated in FIG. 17. Referring to FIGS. 17 through 19, FIG. 19 shows a segmented image corresponding to the first frame IF1 and a segmented image corresponding to the third frame IF3.

For convenience' sake in the description, only one object OB among a plurality of objects included in the segmented images is illustrated. The CPU 250 (in FIG. 3 or 16) determines the local motion vector LMV based on the shift of a feature point in the object OB from a first point P1 to a second point P2. For example, the local motion vector LMV represents the change or motion of the object OB. In this case, the first frame IF1 is selected as a reference frame.

Figure 20:
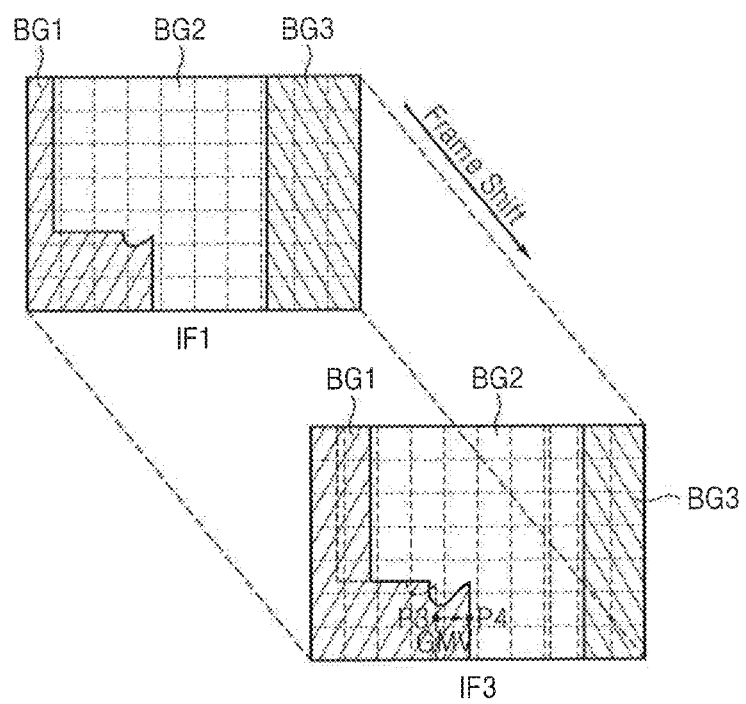
FIG. 20 is a diagram of a global motion vector generated in the course of performing the method illustrated in FIG. 17.

FIG. 20 is a diagram of a global motion vector GMV generated in the course of performing the method illustrated in FIG. 17. Referring to FIGS. 17 through 20, FIG. 20 shows the segmented image corresponding to the first frame IF1 and the segmented image corresponding to the third frame IF3. In this case, the first frame IF1 is selected as a reference frame.

For convenience' sake in the description, only background regions BG1 through BG3 included in the segmented images are illustrated. The CPU 250 (in FIG. 3 or 16) determines the global motion vector GMV based on the shift of a feature point in the background regions BG1 through BG3 from a third point P3 to a fourth point P4.

The global motion vector GMV is determined based on a result of comparing the number of blocks or the area included in the background regions BG1 through BG3 among the frames IF1 through IF3. For example, the global motion vector GMV represents the change or motion of a view point among images.

Figure 21:
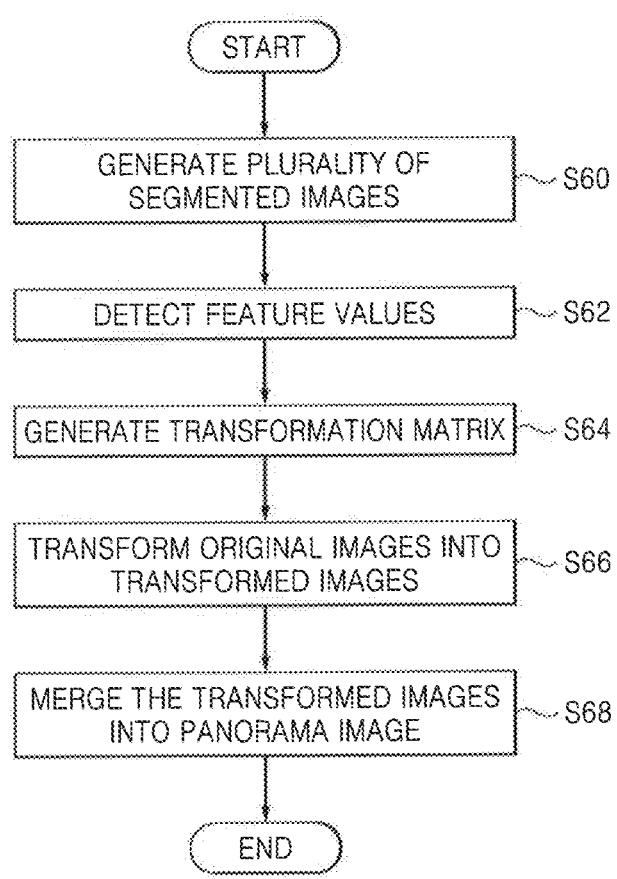
FIG. 21 is a flowchart of a method of operating an image processing system according to an exemplary embodiment of the inventive concept.
Figure 22:
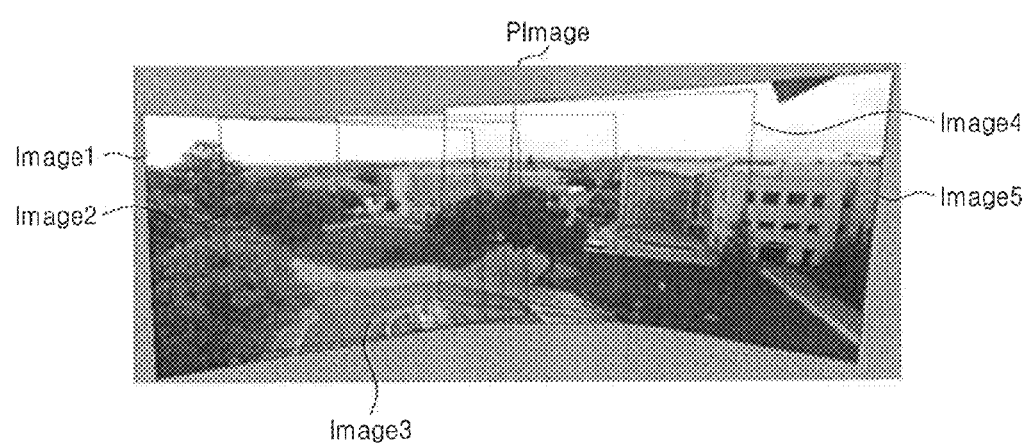
FIG. 22 is a diagram of an example of a panorama image generated according to the method illustrated in FIG. 21.

FIG. 21 is a flowchart of a method of operating an image processing system according to an exemplary embodiment of the inventive concept. FIG. 22 shows an exemplary panorama image generated according to the method illustrated in FIG. 21. Referring to FIGS. 4, 6, 8, 15, 16, 21, and 22, operations S60 and S62 are substantially the same as operations S30 and S32 illustrated in FIG. 15.

The CPU 250 generates the transformation matrix TRMATRIX based on the segmented image data SIDATA and the feature value data FVDATA in operation S64. The transformation matrix TRMATRIX projects the original images onto a cylindrical coordinate system or a spherical coordinate system. The transformation matrix TRMATRIX corresponds to a projection matrix. For example, the projection transformation matrix converts a coordinate system of the original images to a cylindrical coordinate system or a spherical coordinate system.

The CPU 250 generates a global motion vector regarding the change or motion of a view point of a segmented image corresponding to the segmented image data SIDATA based on the segmented image data SIDATA and the feature value data FVDATA. In this case, the CPU 250 generates the transformation matrix TRMATRIX using the global motion vector.

The image transformation hardware component 276 transforms the image data IDATA' corresponding to each of the original images into the image data PDATA corresponding to a transformed image using the transformation matrix TRMATRIX and transmit the image data PDATA corresponding to each of a plurality of transformed images to the CPU 250 through the bus 245 in operation S66.

The CPU 250 merges the transformed images (e.g., Image1 through Image5 in FIG. 22) into a final image in operation S68. The final image has a panorama image PImage. The CPU 250 outputs the image data PDATA corresponding to the final image through the bus 245.

The image subsystem 230 may also include a graphics processing unit (GPU) (not shown) to render the image data PDATA. The image subsystem 230 or 230' may also perform various functions as computational photography architecture in addition to the above-described functions.

As described above, according to an exemplary embodiment of the inventive concept, functions repeatedly used in an image processing are implemented in hardware components, thereby reducing the size of an image subsystem. In addition, the image subsystem may be modified and upgraded. Also, an image may be processed in various ways by combining the functions of the hardware components.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. An image processing system comprising:
    a hardware component configured to receive a first image and generate a first feature value and a first segmented image from the first image, wherein the first segmented image is generated based on a pattern of the first image;
    a central processing unit (CPU) configured to generate a first transformation matrix based on the first segmented image and the first feature value,
    wherein the hardware component is further configured to generate a first transformed image by applying the first transformation matrix to the first image,
    wherein the hardware component comprises:
        an image segmentation hardware component configured to segment the first image and generate the first segmented image;
        an image feature detection hardware component configured to detect the first feature value from the first image or the first segmented image; and
        an image transformation hardware component configured to transform the first image into the first transformed image using the first transformation matrix, and
    wherein the image transformation hardware component is further configured to receive the first image and scale the received first image, outputting the scaled first image to the segmentation hardware component or the image feature detection hardware.

2. The image processing system of claim 1, wherein the image segmentation hardware component comprises:
    an image pattern detector configured to detect a color pattern or a texture pattern from the first image; and
    an image segmentation module configured to segment the first image according to the color pattern or the texture pattern.

3. The image processing system of claim 1, wherein the image feature detection hardware component comprises:
    a feature point detector configured to detect a first feature point from the first image or the first segmented image; and
    a feature determination module configured to determine the first feature value of the first feature point.

4. The image processing system of claim 1, wherein the transformation matrix includes a rotation matrix, a scaling matrix, a translation matrix, a shearing matrix, or a projection matrix.

5. The image processing system of claim 1, wherein the CPU is further configured to:
    select an object from the segmented image, calculate a local motion vector of the selected object using the first feature value that is associated with the selected object, and generate the first transformation matrix based on the local motion vector.

6. The image processing system of claim 5, wherein the transformation matrix comprises information about a weight for the object.

7. The image processing system of claim 1, wherein the hardware component is further configured to receive a second image and generate a second feature value and a second segmented image from the second image.

8. The image processing system of claim 7, wherein the CPU is further configured to:
    select a first object from the first segmented image,
    wherein the first feature value is associated with the first object in the first image, select a second object from the second segmented image,
    wherein the second feature value is associated with the second object in the second image, calculate a local motion vectors using the first feature value and the second feature value, the local motion vector representing a motion of the object, calculate a global motion vector using the first and the second segmented images, the global motion vector representing a change in a view point between the first segmented image and the second segmented image, and generate the first transformation matrix based on the local motion vector and the global motion vector.

9. The image processing system of claim 8, wherein the CPU is further configured to generate an image having an increased dynamic range by merging the first transformed image and the second image, and wherein when the first transformed image and the second image are merged, the first object and the second object are overlapped.

10. The image processing system of claim 7, wherein the central processing unit (CPU) is further configured to receive the second segmented image and the second feature value and generate a second transformation matrix based on the second segmented image and the second feature value, wherein the hardware component is further configured to generate a second transformed image by applying the second transformation matrix to the second image, and wherein the CPU is further configured to generate a panorama image by combining the first transformed image and the second transformed image.

11. The image processing system of claim 10, wherein the first and the second transformation matrix include a transformation matrix for converting a coordinate system of the first image and the second image to a cylindrical coordinate system or a spherical coordinate system.

12. An image processing system for performing a plurality of image processing operations, the image processing system comprising:

a bus;

a hardware component, coupled to the bus, configured to receive a first image and generate a first feature value and a first segmented image from the image for each image processing operation, wherein the first segmented image is generated based on a pattern of the first image;

a central processing unit (CPU), coupled to the bus, configured to generate a first transformation matrix based on the first segmented image and the first feature value for the each image processing operation, wherein the hardware component is further configured to generate a first transformed image by applying the first transformation matrix to the first image, wherein the hardware component comprises:

an image segmentation hardware component, coupled to the bus, configured to output the first segmented image of the first image to the bus;

an image feature detection hardware component, coupled to the bus, configured to output the first feature value to the bus, wherein the first feature value is detected from the first image or the first segmented image; and an image transformation hardware component, coupled to the bus, configured to transform the first image into the first transformed image using the first transformation matrix, and wherein the image transformation hardware component is further configured to receive the first image and scale the received first image, outputting the scaled first image to the segmentation hardware component or the image feature detection hardware.

13. The image processing system of claim 12, wherein the first transformation matrix includes a rotation matrix, a scaling matrix, a translation matrix, a shearing matrix or a projection matrix.

14. The image processing system of claim 12, wherein the plurality of the image processing operations includes a digital image stabilization operation, a dynamic range improvement operation, or a panorama image generating operation.

15. The image processing system of claim 12, further comprising a memory coupled to the bus, wherein the memory is configured to store the first transformed image, wherein the hardware component is further configured to receive a second image and generate a second feature value and a second segmented image from the second image, and wherein if the CPU performs a dynamic range improvement operation, the CPU is further configured to generate an image having an increased dynamic range by merging the first transformed image and the second image.

16. The image processing system of claim 12, further comprising a memory coupled to the bus, wherein the memory is configured to store the first transformed image, wherein the hardware component is further configured to receive a second image and generate a second transformed image by applying a second transformation matrix to the second image, and wherein the CPU is further configured to generate a panorama image by combining the first transformed image and the second transformed image.

17. An image processing system comprising:

a hardware component configured to receive a first image and generate a first feature value and a first segmented image from the first image;

a central processing unit (CPU) configured to generate a first transformation matrix based on the first segmented image and the first feature value, wherein the hardware component is further configured to generate a first transformed image by applying the first transformation matrix to the first image, wherein the hardware component includes:

an image segmentation hardware component configured to segment the first image and generate the first segmented image;

an image feature detection hardware component configured to detect the first feature value from the first image or the first segmented image; and an image transformation hardware component configured to transform the first image into the first transformed image using the first transformation matrix, and wherein the image transformation hardware component is further configured to receive the first image and scale the received first image, outputting the scaled first image to the segmentation hardware component or the image feature detection hardware.

* * * * *